(12) United States Patent
Lee et al.

(10) Patent No.: US 8,502,656 B2
(45) Date of Patent: Aug. 6, 2013

(54) DISPLACEMENT DIAGNOSIS SENSOR OF BRAKE PEDAL HAVING STOP LAMP SWITCH FUNCTION

(75) Inventors: Kwanghyuck Lee, Busan (KR); Byungju Kim, Daegu (KR)

(73) Assignee: Donghee Industrial Co., Ltd., Ulsan (KR)

( * ) Notice: Subject to any disclaimer, the term of this patent is extended or adjusted under 35 U.S.C. 154(b) by 203 days.

(21) Appl. No.: 13/206,604

(22) Filed: Aug. 10, 2011

(65) Prior Publication Data

US 2012/0056739 A1 Mar. 8, 2012

(30) Foreign Application Priority Data

Sep. 6, 2010 (KR) .................... 10-2010-0086839

(51) Int. Cl.
*B60Q 1/44* (2006.01)

(52) U.S. Cl.
USPC ... 340/479; 340/933; 340/425.5; 340/426.24; 340/426.32; 340/426.33; 340/453

(58) Field of Classification Search
USPC ............... 340/933, 425.5, 426.24, 426.32, 340/426.33, 453
See application file for complete search history.

(56) References Cited

U.S. PATENT DOCUMENTS

| | | | | |
|---|---|---|---|---|
| 4,709,969 A | * | 12/1987 | Heess et al. | 303/114.1 |
| 4,824,187 A | * | 4/1989 | Heess et al. | 303/113.3 |
| 4,855,712 A | * | 8/1989 | Wiley et al. | 340/453 |
| 6,201,389 B1 | | 3/2001 | Apel et al. | |
| 6,396,259 B1 | | 5/2002 | Washeleski et al. | |
| 6,689,016 B2 | | 2/2004 | Apel | |
| 2010/0026083 A1 | * | 2/2010 | Leiber et al. | 303/3 |
| 2010/0089054 A1 | * | 4/2010 | Leiber | 60/547.1 |

FOREIGN PATENT DOCUMENTS

| | | |
|---|---|---|
| JP | 2002-023872 A | 1/2002 |
| JP | 2005-225381 A | 8/2005 |

* cited by examiner

*Primary Examiner* — Daryl Pope
(74) *Attorney, Agent, or Firm* — LRK Patent Law Firm

(57) ABSTRACT

A displacement diagnosis sensor of a brake pedal having a stop lamp switch function is provided. According to the present invention, one sensor performs both a function of a stop lamp switch and a function of diagnosing a rotational displacement of the brake pedal simultaneously to thereby save a manufacturing cost and reduce a weight.

13 Claims, 12 Drawing Sheets

DISPLACEMENT DIAGNOSIS SENSOR OF BRAKE PEDAL HAVING STOP LAMP SWITCH FUNCTION

CROSS-REFERENCE TO RELATED APPLICATIONS

The present application claims priority to Korean Patent Application Number 10-2010-0086839 filed Sep. 6, 2010, the entire contents of which application is incorporated herein for all purposes by this reference.

BACKGROUND OF THE INVENTION

1. Field of the Invention

The present invention relates to a displacement diagnosis sensor of a brake pedal having a stop lamp switch function.

2. Description of Related Art

In general, a stop lamp (aka. 'brake lamp') assisting safety driving by calling attention to a rear driver is mounted on the rear of a vehicle and therefore, the stop lamp is configured to be turned on by operating a stop lamp switch when a driver of the vehicle presses a brake pedal.

Further, in recent years in which recognition of braking safety of the vehicle has gradually become important, a sensor diagnosing a displacement of the brake pedal has been additionally provided and therefore, the displacement diagnosis of the brake pedal transfers driver's braking will immediately to a brake system of the vehicle as an electrical signal when the driver presses the brake pedal, thereby maximizing braking safety performance of the vehicle.

However, in the vehicles according to the related art, the stop lamp switch and the displacement diagnosis sensor that are interlocked with operation of the brake pedal are separately provided, thus, a manufacturing cost and a weight increased and furthermore, an additional installation space should be reserved.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

The present invention has been made in an effort to provide a displacement diagnosis sensor of a brake pedal having a stop lamp switch function that can save a manufacturing cost and reduce a weight, and efficiently reserve an installation space.

An exemplary embodiment of the present invention provides a displacement diagnosis sensor of a brake pedal, including: a sensor housing having a connector with a terminal and fixed to one side of a pedal mounting bracket; a permanent magnet integrally coupled to center of one side a magnet case facing a sensor housing while the magnet case is rotatably coupled to one side of the sensor housing; a sensor lever rotating the magnet case on its axis when a brake pedal rotates while one end thereof is integrally coupled to center of the other side the magnet case and the other end thereof is connected to the brake pedal rotatably coupled to the pedal mounting bracket; a printed circuit board fixed and coupled to the other side of the sensor housing; and a hall element fixed to a position of the printed circuit board facing the permanent magnet with being spaced apart from the permanent magnet, and generating current corresponding to a magnetic field generated from the permanent magnet and applying current corresponding to the magnetic field to a controller through the terminal when the permanent magnet rotates, wherein the controller converts the current applied from the hall element into an electrical signal corresponding to a rotational displacement amount of the brake pedal and outputs the corresponding electrical signal and at the same time, outputs a control signal for turning on a stop lamp installed in a vehicle when a value of the converted electrical signal is equal to or more than a set value which is previously set and outputs a control signal for turning off the stop lamp when the converted electrical signal value is less than the set value.

According to exemplary embodiments of the present invention, one sensor can perform both a function of a stop lamp switch and a function of diagnosing a rotational displacement of a brake pedal simultaneously so as to save a manufacturing cost and reduce a weight, and efficiently reserve an installation space.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
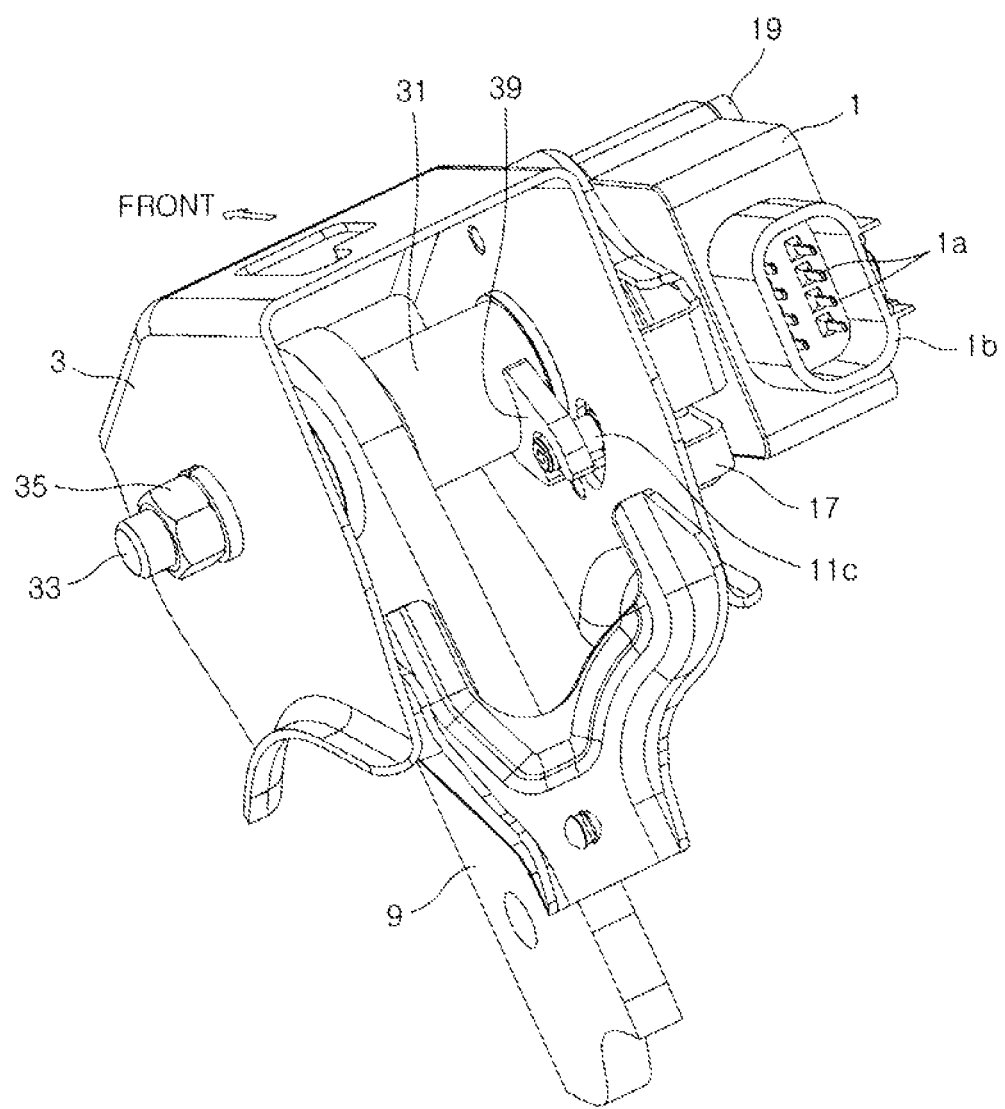
FIG. 1 is a perspective view illustrating a state in which a sensor is coupled with a brake pedal according to an exemplary embodiment of the present invention.
Figure 2:
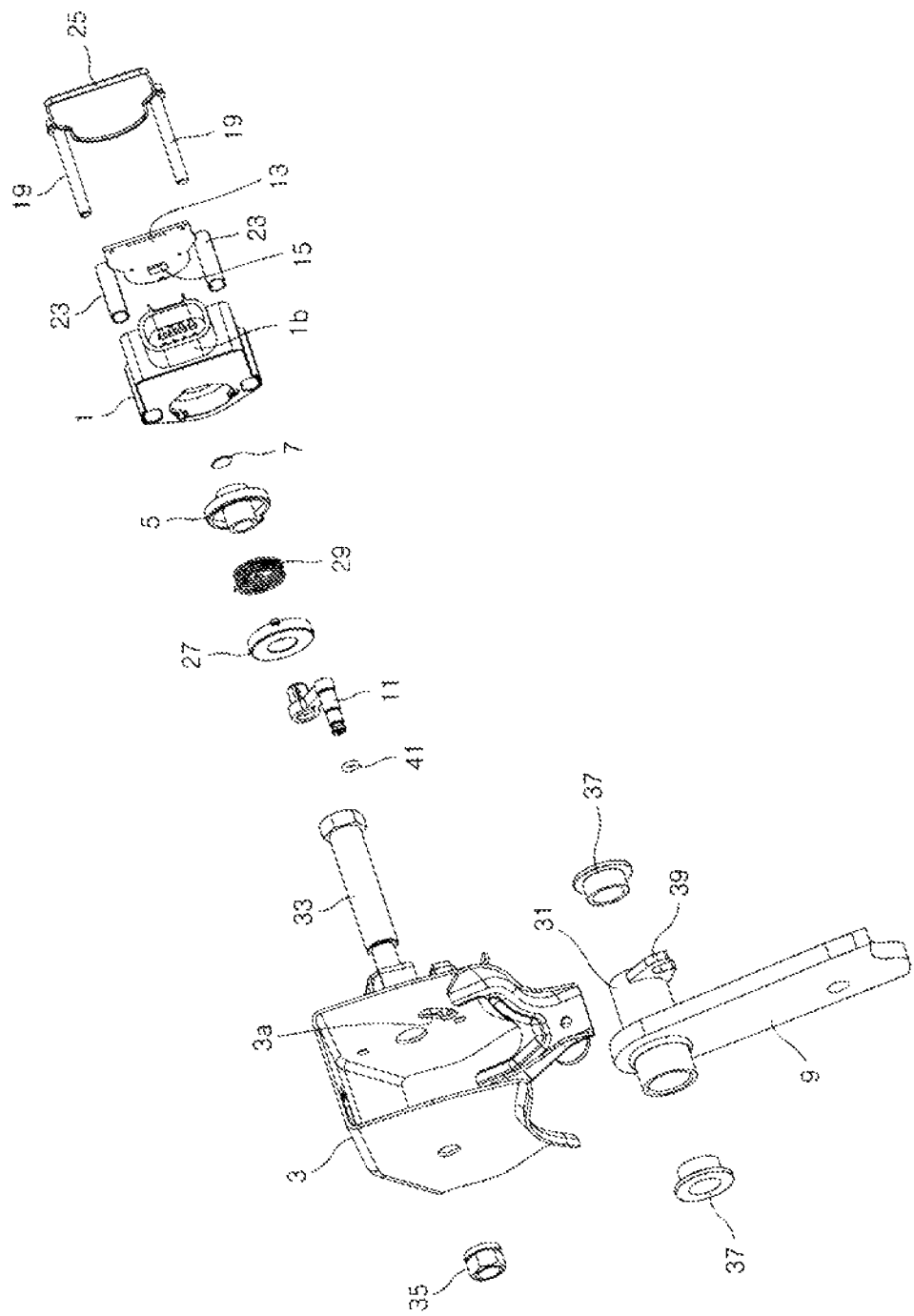
FIGS. 2 and 3 are exploded perspective views of a sensor according to an exemplary embodiment of the present invention.
Figure 3:
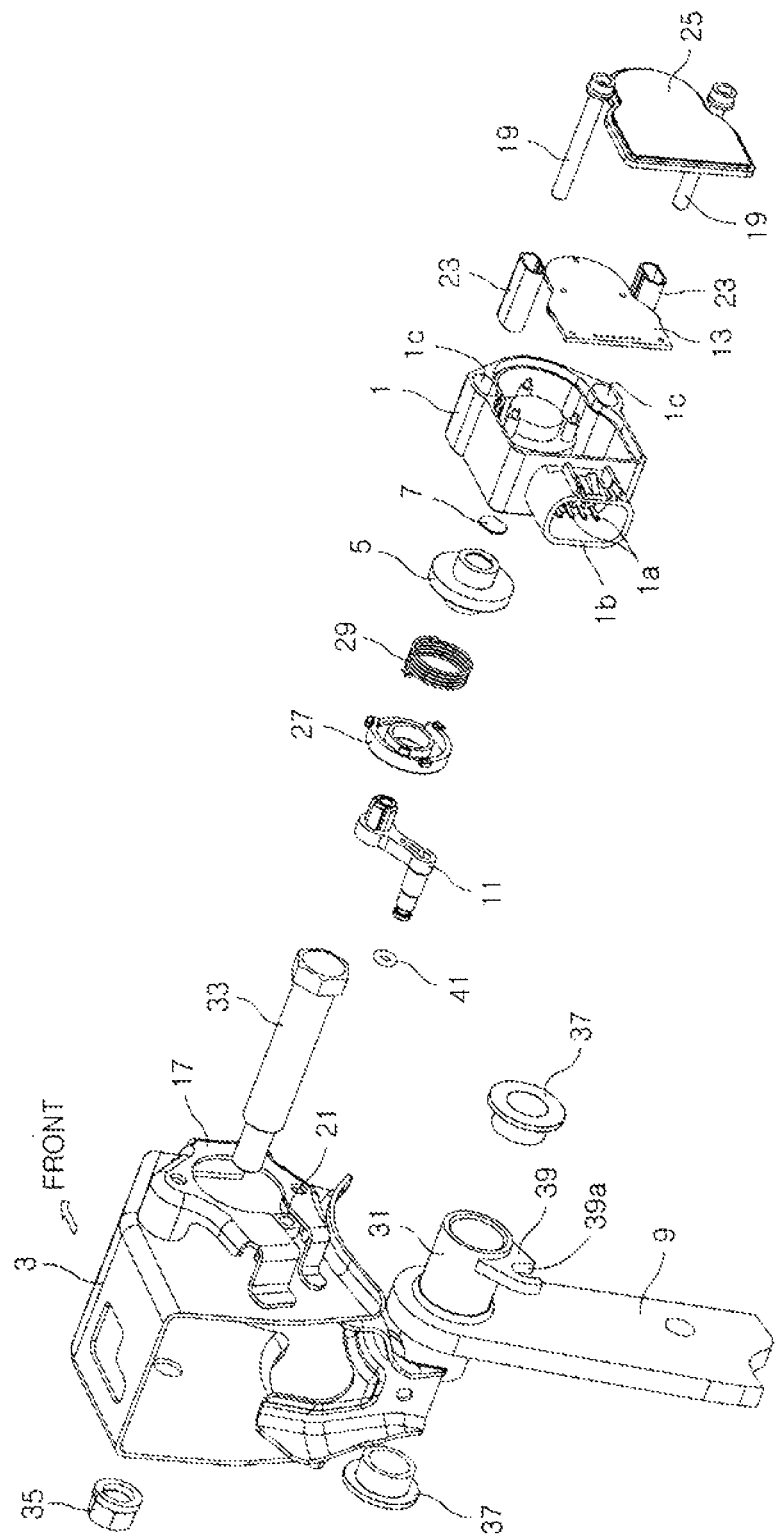
Figure 4:
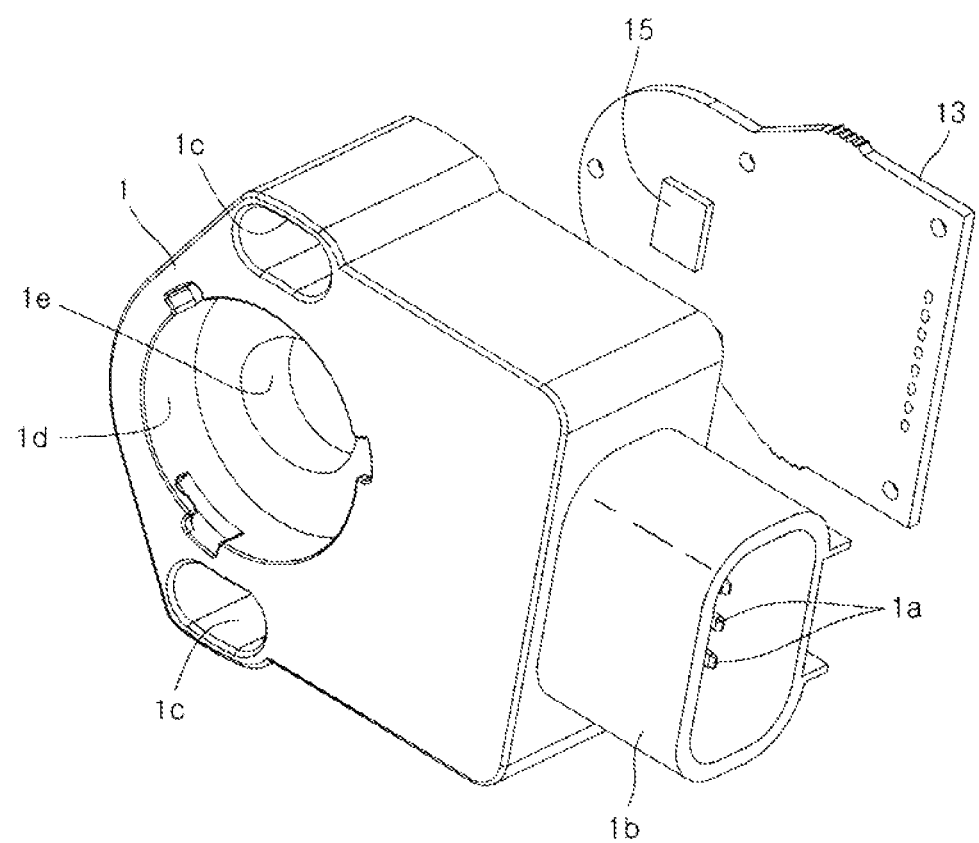
FIGS. 4 to 10 are diagrams for describing constituent components of a sensor according to an exemplary embodiment of the present invention.
Figure 5:
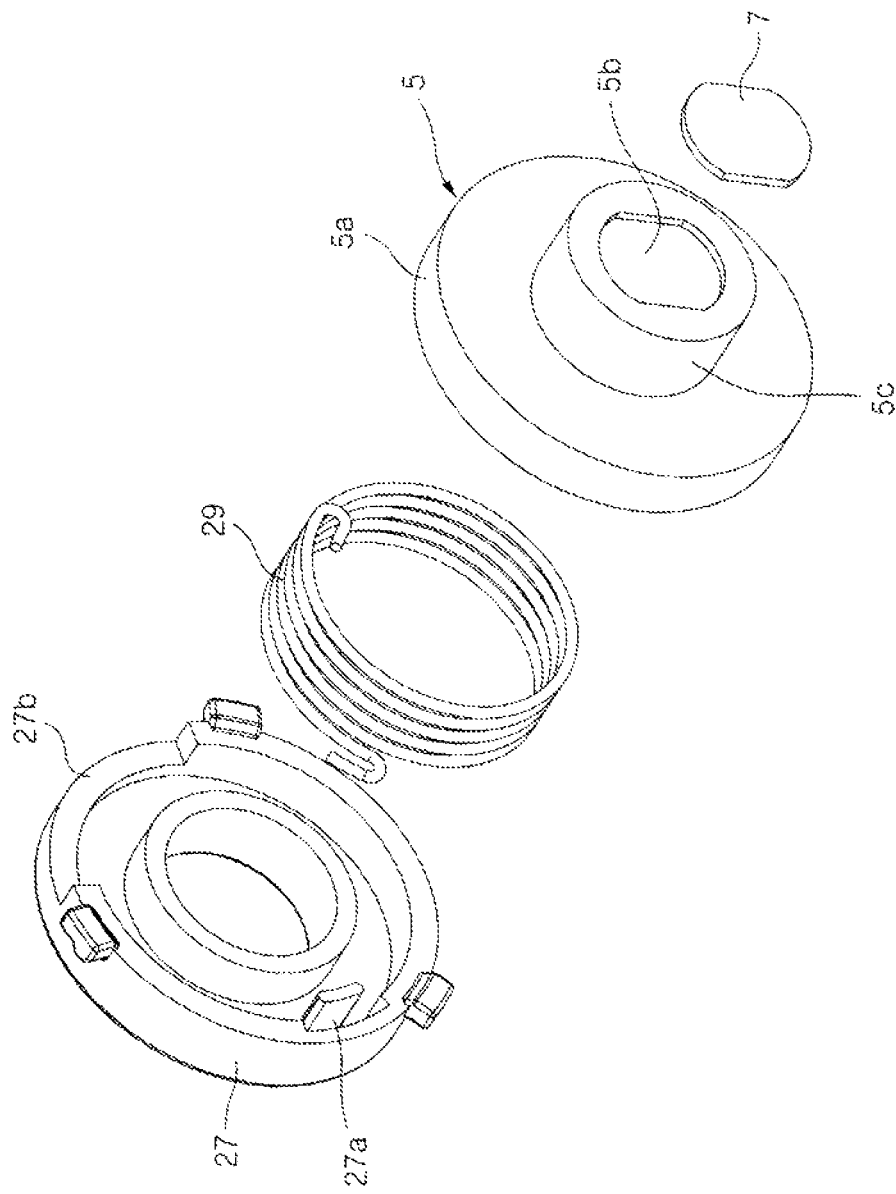
Figure 6:
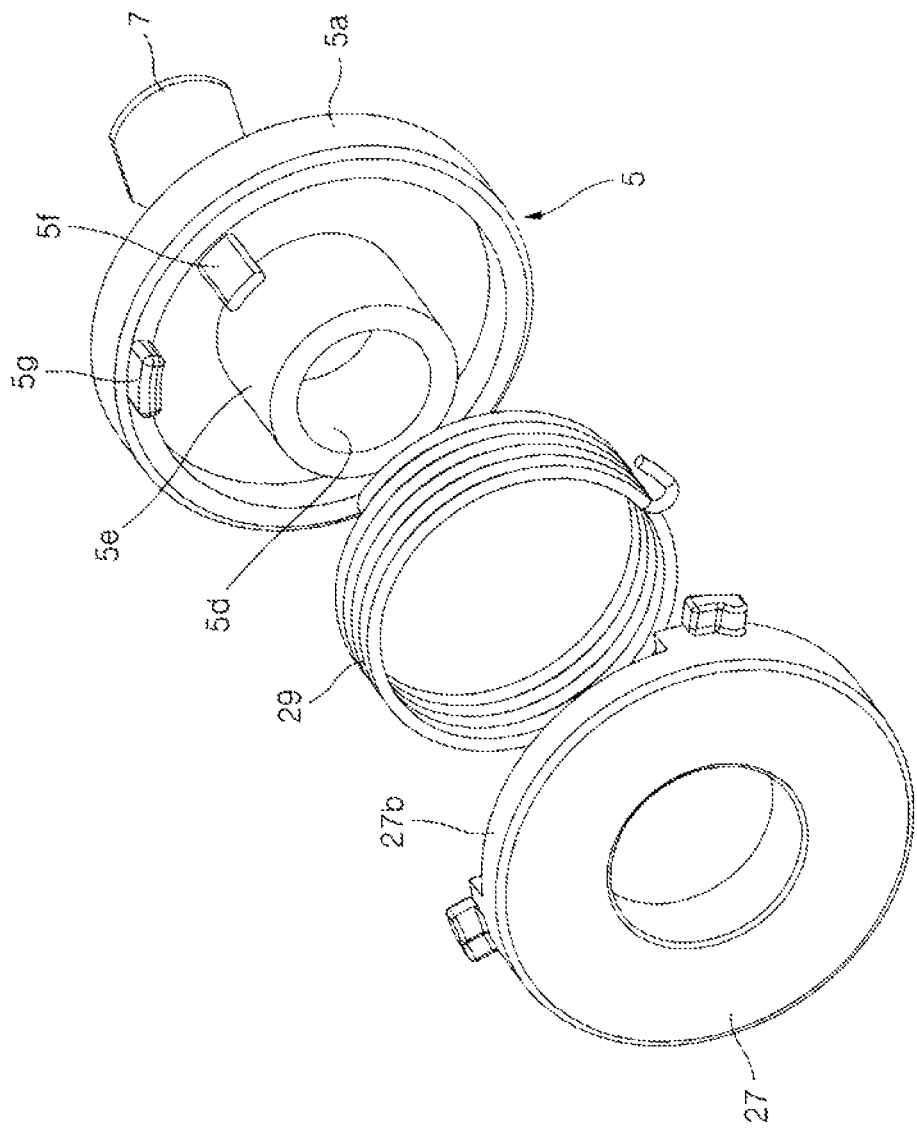
Figure 7:
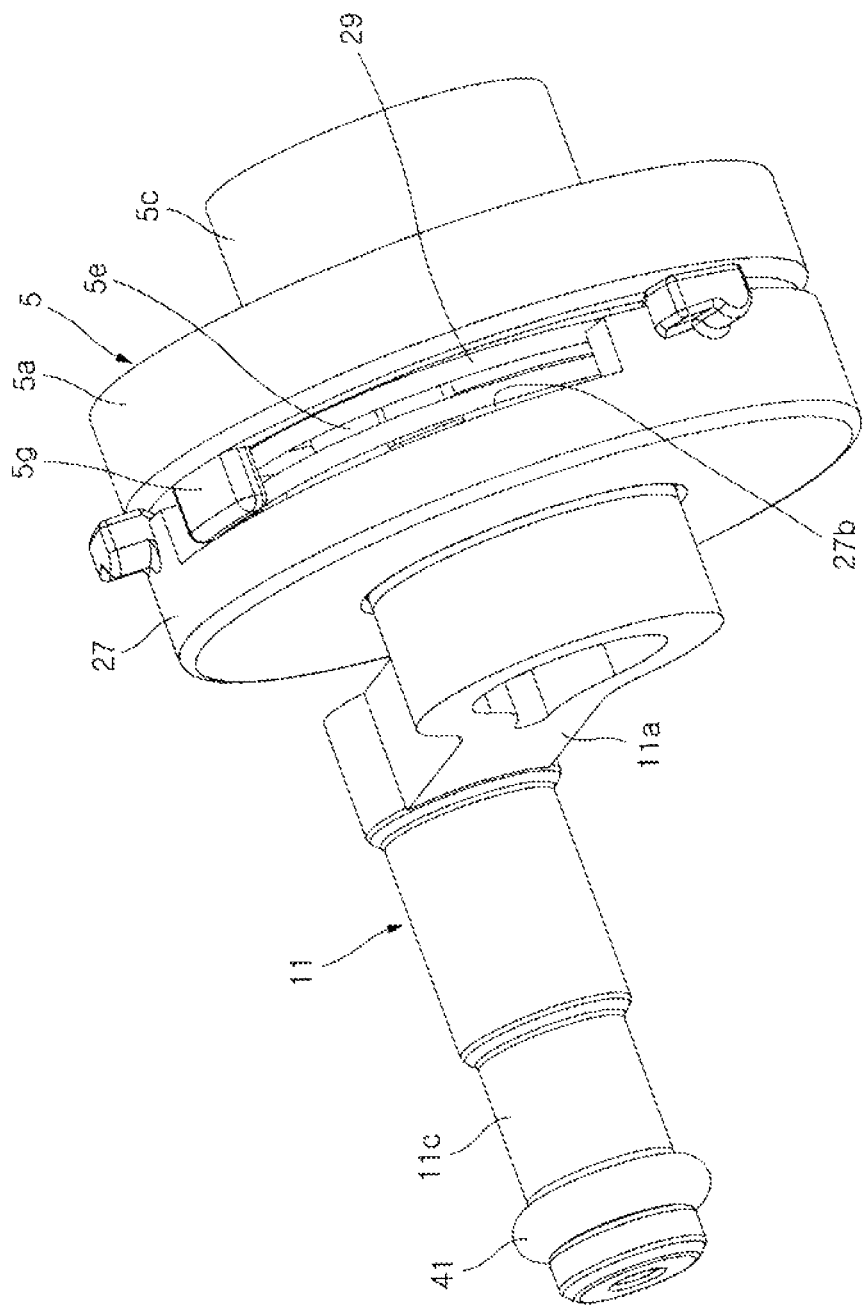
Figure 8:
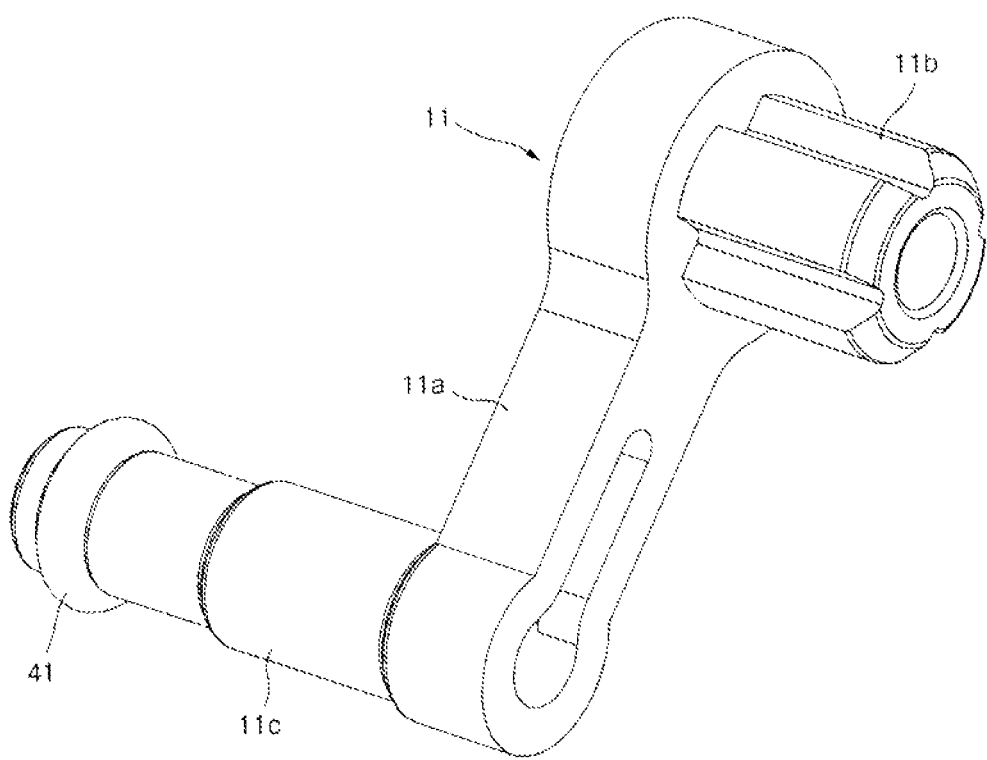

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described in detail with reference to the accompanying drawings.

A displacement diagnosis sensor of a brake pedal according to an exemplary embodiment of the present invention includes a sensor housing 1 having a connector 1b with a terminal 1a and fixed to one surface of a pedal mounting bracket 3, a permanent magnet 7 integrally coupled to the center of one side a magnet case 5 facing the sensor housing 1 while the magnet case 5 is rotatably coupled to one side of the sensor housing 1, a sensor lever 11 rotating the magnet case 5 on its axis when a brake pedal 9 rotates while one end thereof is integrally coupled to the center of the other side the magnet case 5 and the other end thereof is connected to the brake pedal 9 rotatably coupled to the pedal mounting bracket 3, a printed circuit board (PCB) 13 fixed and coupled to the other side of the sensor housing 1, and a hall element 15 fixed to a position of the printed circuit board 13 facing the permanent magnet 7 with being spaced apart from the permanent magnet 7, and sensing the intensity of a magnetic field generated from the permanent magnet 7 and generating current corresponding to the intensity when permanent magnet rotates, as shown in FIGS. 1 to 11.

Herein, the pedal mounting bracket 3 is fixed to a vehicle body below a driver's seat.

A sensor bracket 17 is fixed and coupled to one surface of the pedal mounting bracket 3 and the sensor housing 1 is fixed and coupled to the sensor bracket 17 through bolts 19 and nuts 21. Therefore, joining holes 1c are formed in the sensor housing 1 and housing bushes 23 are inserted into the joining holes 1c. The bolts 19 penetrate the housing bush 23 and thereafter, are joined with the nuts 21, and as a result, the sensor housing 1 is installed in the sensor bracket 17.

In addition, the hall element 15 is electrically connected with the printed circuit board 13. The printed circuit board 13 is electrically connected with the terminal 1a provided in the sensor housing 1. The terminal 1a is electrically connected with a controller (not shown) that receives an electrical signal of current generated from the hall element 15 to output a signal for controlling on and off operations of a stop lamp and judges a displacement of a rotational amount of the brake pedal 9 to output an electrical signal corresponding to the displacement.

Further, permanent magnet 7 has a disk shape in which an N pole and an S pole are separated at an interval of 180 degrees.

A case groove 1d into which the magnet case 5 is self-rotatably inserted is formed at one side of the sensor housing 1, a center groove 1e into which a portion of the magnet case 5 coupled with the permanent magnet 7 is rotatably inserted is formed at the center of the case groove 1d, and a housing cover 25 is removably coupled to the other side of the sensor housing 1 to protect the printed circuit board 13.

The magnet case 5 includes a disk portion 5a rotatably inserted into the case groove 1d of the sensor housing 1, a magnet coupling protrusion 5c protruding from the center of one side the disk portion 5a to be rotatably inserted into the center groove 1e and having a magnet groove 5b into which the permanent magnet 7 is inserted and fixed, which is formed on a front surface thereof, and a lever coupling protrusion 5c protruding from the center of the other side the disk portion 5a and having a lever groove 5d to be inserted and integrally coupled to one end of the sensor lever 11.

Further, the sensor according to the exemplary embodiment of the present invention further includes a case cover 27 preventing the magnet case 5 from being separated from the case groove 1d by being fixed and coupled to the sensor housing 1 so as to seal the case groove 1d of the sensor housing 1 and a return spring 29 providing restoration force when the magnet case 5 self-rotates while both ends thereof are respectively fixed to the magnet case 5 and the case cover 27, in a space between the magnet case 5 and the case cover 27.

Herein, spring suspending protrusions 5f and 27a are integrally formed in the magnet case 5 and the case cover 27, respectively so that both ends of the return spring 29 as a coil spring are suspended and coupled to the magnet case 5 and the case cover 27, respectively.

In addition, a case protrusion 5g is integrally protruded on the periphery of the magnet case 5 toward the case cover 27 so as to control a rotational angle of the magnet case 5 and a rotation restricting groove 27b inserted with the case protrusion 5g and cut in a predetermined angle range along a rotational radius of the case protrusion 5g to restrict rotation of the case protrusion 5g is integrally formed on the periphery of the case cover 27.

The sensor lever 11 includes a straight line-type connection rod 11a, a case coupling protrusion 11b bent in a perpendicular direction at one end of the connection rod 11a and inserted into the lever groove 5d of the magnet case 5 to be integrally coupled with the lever coupling protrusion 5e through spline coupling, and a pedal connection protrusion 11c perpendicularly bent to face an opposite direction of the case coupling protrusion 11b at the other end of the connection rod 11a and connected with the brake pedal 9.

Meanwhile, a pedal pipe 31 is integrally coupled to an upper end of the brake pedal 9 and the pedal pipe 31 is rotatably coupled to the pedal mounting bracket 3 through a bolt 33 and a nut 35.

A pipe bush 37 is coupled to both ends of the pedal pipe 31 to thereby prevent the pedal pipe 31 from interfering in the bolt 33 and the nut 35.

As a result, when a driver presses the brake pedal 9, the brake pedal 9 rotates forward as the pedal pipe 31 engaged in the bolt 33 rotates and when a driver's foot is separated from the brake pedal 9, the brake pedal 9 that rotates forward rotates backward by restoration force of a pedal spring (not shown) to return to an initial position.

In addition, a pipe flange 39 with a U-shaped lever coupling groove 39a is integrally coupled to the pedal pipe 31 and therefore, the pedal connection protrusion 1c of the sensor lever 11 is inserted into and coupled to the lever coupling groove 39a by passing through a through-hole 3a of the pedal mounting bracket 3, and as a result, the sensor lever 11 may be connected with the brake pedal 9.

Herein, the through-hole 3a formed in the pedal mounting bracket 3 is a shape of a slit hole formed in an arc shape along a rotational radius of the pedal connection protrusion 11c.

Further, since a gap may be generated between the pedal connection protrusion 11c and the lever coupling groove 39a due to a processing error and an assembly error of the pedal connection protrusion 11c and the lever coupling groove 39a, an O-ring 41 made of rubber is coupled to the pedal connection protrusion 11c in order to prevent the gap.

In addition, the pedal connection protrusion 11c of the sensor lever 11 and the bolt 33 serving as a rotational center of the pedal pipe 31 are installed to be positioned on the same axial line.

Hereinafter, an operation of the exemplary embodiment of the present invention will be described.

Figure 9:
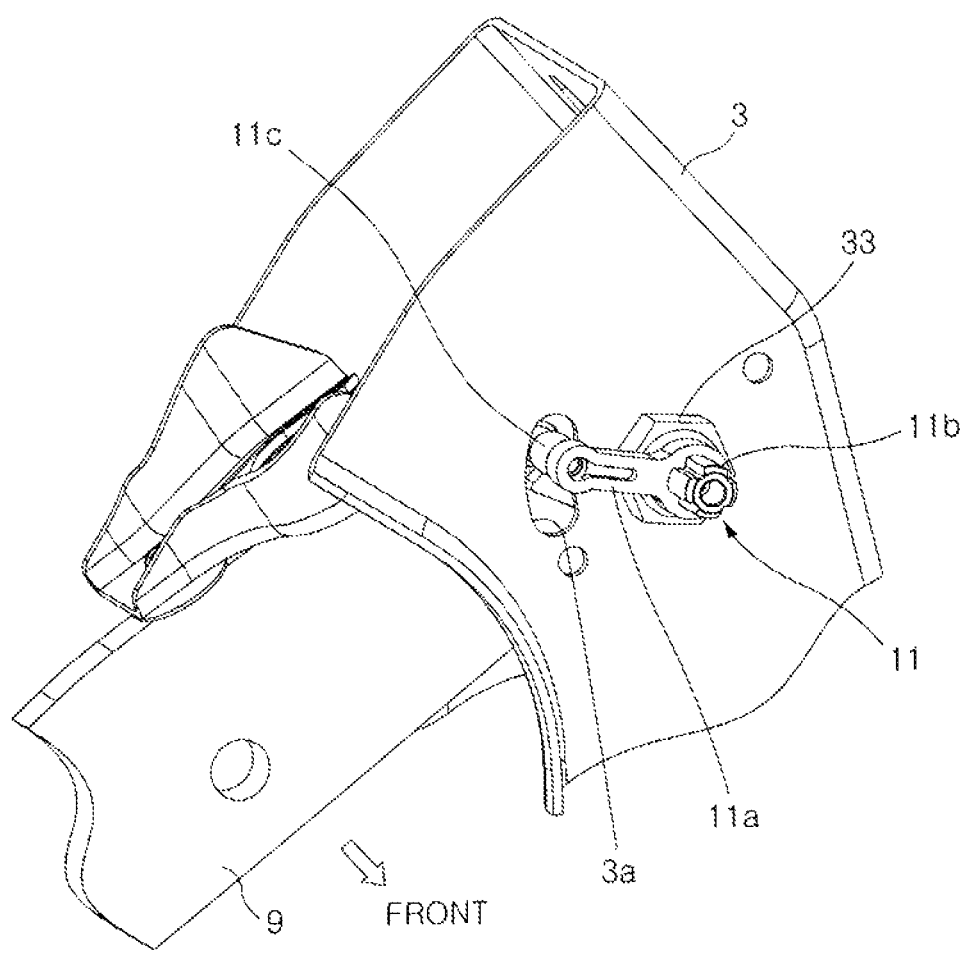
Figure 10:
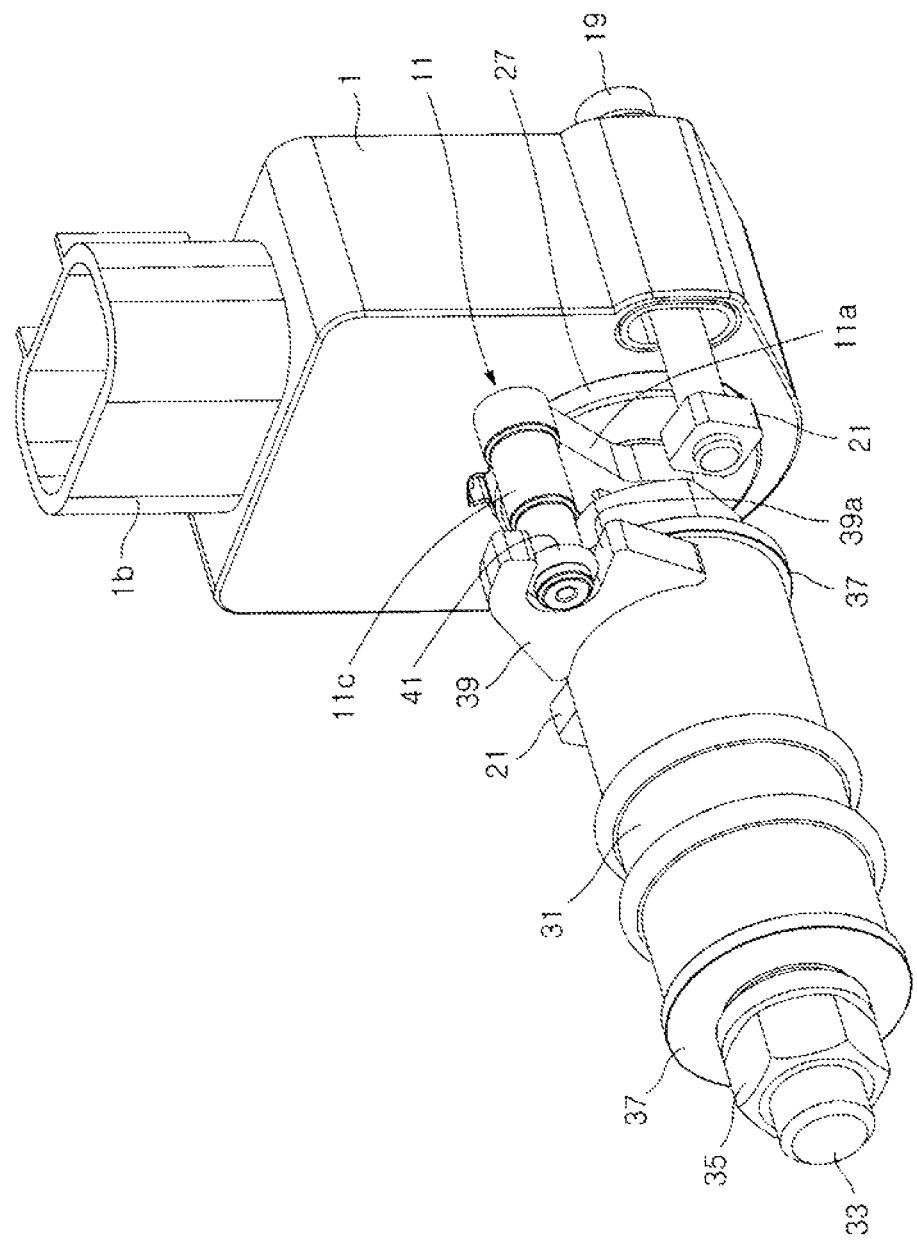
Figure 11:
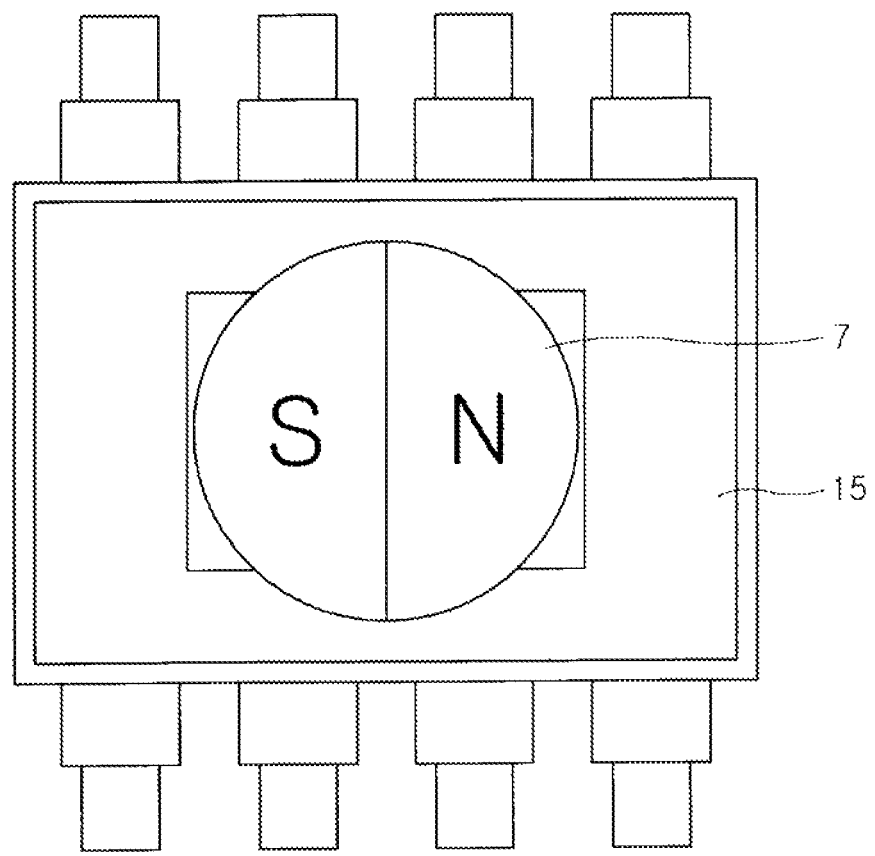
FIGS. 11 and 12 are diagrams for describing an operation process of a sensor according to an exemplary embodiment of the present invention in depending on a rotation state of a permanent magnet.

First, states of FIGS. 1 and 9 represent a state in which a driver does not apply a pedal pressure to a brake pedal 9 and the brake pedal 9 does not rotate forward and this case, a permanent magnet 7 maintains an initial state as shown in FIG. 11.

In the initial state, as the permanent magnet 7 does not rotate, a magnetic field is not generated from the permanent magnet 7, and as a result, a hall element 15 does not generate current. Therefore, a controller judges that a rotational displacement amount of the brake pedal 9 is zero and controls a stop lamp to maintain an off state.

In the initial state, when brake pedal 9 rotates forward as the driver presses the brake pedal 9, a pedal connection protrusion 11c of a sensor lever 11 is interlocked with rotation of the brake pedal 9 to move along a through-hole 3a of a pedal mounting bracket 3 and at the same time, a case coupling protrusion 11b of the sensor lever 11 rotates axially.

Therefore, a magnet case 5 coupled with the case coupling protrusion 11b rotates in a case groove 1d and at the same time, the permanent magnet 7 coupled to the magnet case 5 also rotates. Herein, when the magnet case 5 rotates, a return spring 29 is compressed.

Meanwhile, when the permanent magnet 7 rotates, the magnetic field is generated from the permanent magnet 7 from that time and a hall element 15 senses the intensity of the magnetic field generated from the permanent magnet 7 to generate current corresponding to the intensity.

When current is generated from the hall element 15 as described above, the controller receives a value of the generated current and converts the current value into voltage corresponding to the current value. In addition, the controller transfers an electrical signal corresponding to the intensity of the converted voltage, i.e., information corresponding to the rotational displacement amount of the brake pedal 9 to an electronic control unit (ECU) of a vehicle.

Further, a value of the voltage converted while converting the current value generated from the hall element 15 into the voltage is compared with a set value and when it is judged that the values coincide with each other, the controller outputs a signal corresponding to the rotational displacement amount of the brake pedal 9, while generates and outputs another signal other than the signal corresponding to the rotational displacement amount, thereby maintaining the stop lamp as an on state.

Figure 12:
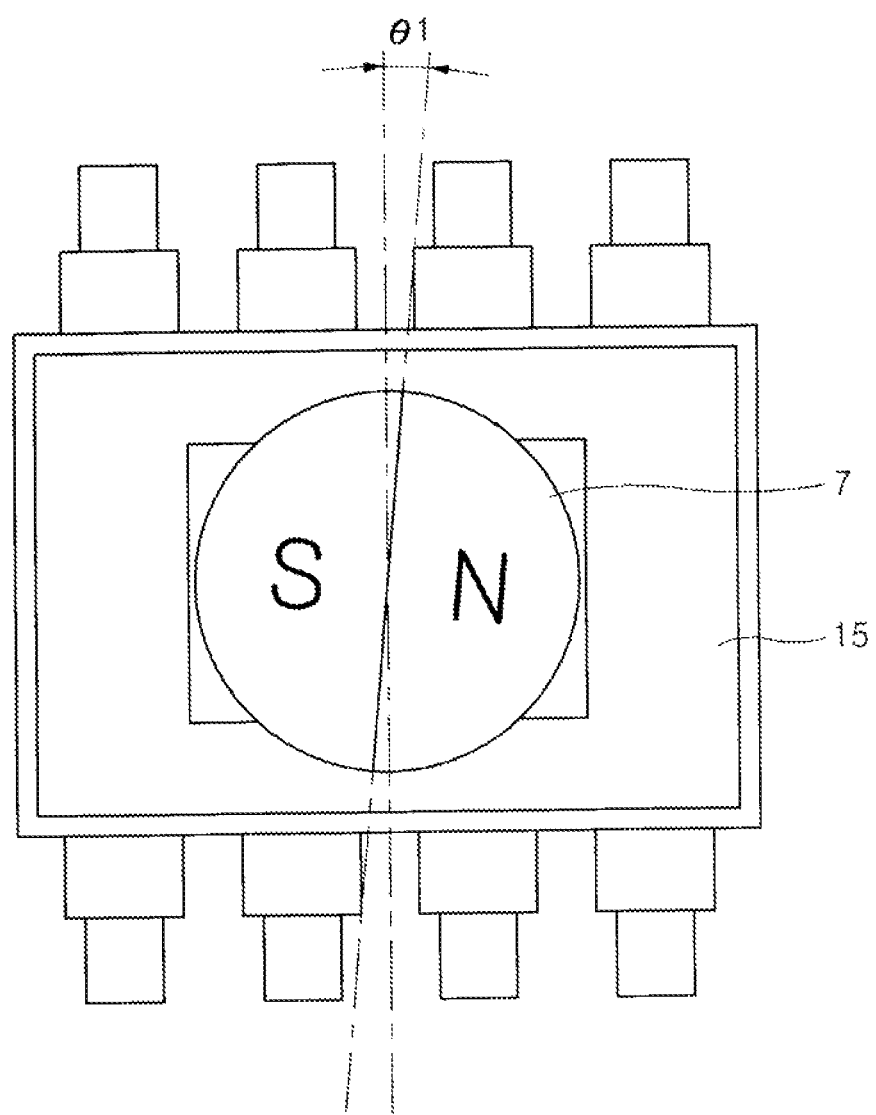

More specifically, when the permanent magnet 7 rotates at approximately 2 degrees to 4 degrees to be changed to a state θ1 shown in FIG. 12 from the initial state of FIG. 11 in which the permanent magnet 7 does not rotate, the controller compares a voltage value at that time with a set value and judges whether both voltage values coincide with each other and when both voltage values coincide with each other, the controller outputs a control signal to switch the stop lamp which is in the off state to the on state.

On the contrary, as the driver's foot is separated from the brake pedal 9, a rotational state of the permanent magnet 7 gradually decreases so as to become the state of FIG. 11 and at the time when the rotational state further decreases than the state of FIG. 12, the stop lamp is switched over to the off state again by the control signal of the controller. The controller continuously outputs the signal corresponding to the rotational displacement amount of the brake pedal 9 and transfers to the corresponding signal to the ECU of the vehicle. ECU performs its own functions by using the rotational displacement amount of the brake pedal 9. In other words, ECU interacts with the controller according to the present invention like that it interacts with all almost of controllers mounted a vehicle. When The control signal that causes the switching to the off state is transferred to ECU from the controller according to the present invention, the transferred control signal may be used in a control operation associated with travelling of the vehicle among control operations of the ECU.

In addition, when the permanent magnet rotates more than the state of FIG. 12, the stop lamp may continuously maintain the on state by the control signal of the controller.

Further, the controller continuously outputs the signal corresponding to the rotational displacement amount of the brake pedal 9 to the ECU until the rotational state of the permanent magnet 7 becomes the initial state of FIG. 11.

As described above, according to the exemplary embodiments of the present invention, since one sensor can perform two functions, i.e., both the function of the stop lamp switch and the function of diagnosing the rotational displacement of the brake pedal simultaneously, it is possible to save a manufacturing cost and reduce a weight. Moreover, since the exemplary embodiment of the present invention can be easily installed when only a minimum installation space is provided, installation efficiency can be improved.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A displacement diagnosis sensor of a brake pedal, comprising:
    a sensor housing having a connector with a terminal and fixed to one surface of a pedal mounting bracket;
    a permanent magnet integrally coupled to center of one side a magnet case facing the sensor housing while the magnet case is rotatably coupled to one side of the sensor housing;
    a sensor lever rotating the magnet case on its axis when a brake pedal rotates while one end thereof is integrally coupled to center of the other side the magnet case and the other end thereof is connected to the brake pedal rotatably coupled to the pedal mounting bracket;
    a printed circuit board fixed and coupled to the other side of the sensor housing; and
    a hall element fixed to a position of the printed circuit board facing the permanent magnet with being spaced apart from the permanent magnet, and generating current corresponding to a magnetic field generated from the permanent magnet and applying current corresponding to the magnetic field to a controller through the terminal when the permanent magnet rotates,
    wherein the controller converts the current applied from the hall element into an electrical signal corresponding to a rotational displacement amount of the brake pedal and outputs the corresponding electrical signal and at the same time, outputs a control signal for turning on a stop lamp installed in a vehicle when a value of the converted electrical signal is equal to or more than a set value which is previously set and outputs a control signal for turning off the stop lamp when the converted electrical signal value is less than the set value.

2. The displacement diagnosis sensor of a brake pedal as defined in claim 1, wherein a case groove into which the magnet case is self-rotatably inserted is formed at one side of the sensor housing, a center groove into which a portion of the magnet case coupled with the permanent magnet is rotatably inserted is formed at the center of the case groove, and a housing cover is removably coupled to the other side of the sensor housing in order to protect the PCB.

3. The displacement diagnosis sensor of a brake pedal as defined in claim 2, wherein the magnet case includes:

a disk portion rotatably inserted into the case groove;

a magnet coupling protrusion protruding from center of one side the disk portion to be rotatably inserted into the center groove and having a magnet groove into which the permanent magnet is inserted and fixed, which is formed on a front surface thereof; and a lever coupling protrusion protruding from center of the other side the disk portion and having a lever groove to be inserted and integrally coupled to one end of the sensor lever.

4. The displacement diagnosis sensor of a brake pedal as defined in claim 2, further comprising:

a case cover preventing the magnet case from being separated from the case groove by being fixed and coupled to the sensor housing so as to seal the case groove of the sensor housing; and a return spring providing restoration force when the magnet case self-rotates while both ends thereof are respectively fixed to the magnet case and the case cover, in a space between the magnet case and the case cover.

5. The displacement diagnosis sensor of a brake pedal as defined in claim 4, wherein a case protrusion is integrally protruded on the periphery of the magnet case toward the case cover so as to control a rotational angle of the magnet case, and a rotation restricting groove inserted with the case protrusion and cut in a predetermined angle range along a rotational radius of the case protrusion to restrict rotation of the case protrusion is integrally formed on the periphery of the case cover.

6. The displacement diagnosis sensor of a brake pedal as defined in claim 3, wherein the sensor lever includes:

a connection rod;

a case coupling protrusion bent in a perpendicular direction at one end of the connection rod and inserted into the lever groove to be integrally coupled with the lever coupling protrusion; and a pedal connection protrusion perpendicularly bent to face an opposite direction of the case coupling protrusion at the other end of the connection rod and connected with the brake pedal.

7. The displacement diagnosis sensor of a brake pedal as defined in claim 6, wherein a pedal pipe is integrally coupled to an upper end of the brake pedal, the pedal pipe is rotatably coupled and installed to the pedal mounting bracket through a bolt and a nut, a pipe flange with a U-shaped lever coupling groove is integrally coupled to the pedal pipe, and the pedal connection protrusion is inserted into and coupled to the lever coupling groove by passing through a through-hole of the pedal mounting bracket, and as a result, the sensor lever is capable of being connected with the brake pedal.

8. The displacement diagnosis sensor of a brake pedal as defined in claim 7, wherein an O-ring made of rubber is coupled to the pedal connection protrusion to absorb an assembly error between the pedal connection protrusion and the lever coupling groove, and the O-ring is inserted into the lever coupling groove to connect and couple the sensor lever and the pipe flange to each other.

9. The displacement diagnosis sensor of a brake pedal as defined in claim 7, wherein the through-hole formed in the pedal mounting bracket is a slit hole formed in an arc shape along a rotational radius of the pedal connection protrusion.

10. The displacement diagnosis sensor of a brake pedal as defined in claim 1, wherein a sensor bracket is fixed and coupled to one surface of the pedal mounting bracket, and the sensor housing is fixed and coupled to the sensor bracket.

11. The displacement diagnosis sensor of a brake pedal as defined in claim 1, wherein the permanent magnet has a disk shape in which an N pole and an S pole are separated at an interval of 180 degrees.

12. The displacement diagnosis sensor of a brake pedal as defined in claim 7, wherein the pedal connection protrusion of the sensor lever and the bolt serving as a rotational center of the pedal pipe are installed to be positioned on the same axial line.

13. The displacement diagnosis sensor of a brake pedal as defined in claim 1, wherein a control signal for turning off the stop lamp is switched to turn off the stop lamp and at the same time, transferred to an electronic control unit (ECU) of a vehicle to be used in a control operation associated with travelling of the vehicle.

\* \* \* \* \*